: 2,963,378
Patented Dec. 6, 1960

2,963,378

GLASS BEADS HEMISPHERICALLY REFLECTORIZED WITH METALLIC COATING AND COMPOSITIONS THEREOF

Philip V. Palmquist, New Canada Township, Ramsey County, and Warren R. Beck, Mahtomedi, Minn., assignors to Minnesota Mining & Manufacturing Company, St. Paul, Minn., a corporation of Delaware No Drawing. Filed Apr. 25, 1955, Ser. No. 503,837

4 Claims. (Cl. 106—193)

This invention relates to new and useful reflective pigments that are reflex-reflecting, and to reflective coating compositions containing such pigments. These compositions can be used to provide coatings for highway signs and markers that have brilliant long-range visibility when viewed at night by motorists owing to their reflex-reflecting property, the reflection efficiency being much greater than that of ordinary painted signs and markers.

The pigment material in its dry form consists of a free-flowing or fluid mass of transparent glass microspheroids that are of flour-like fineness and are hemispherically reflectorized.

Each microspheroid is a minute glass sphere or spheroid which is transparent and is reflectorized over approximately half its area, conveniently with a thin metallic reflector coating, such as a coating of aluminum, forming an integral hemispherical reflector cap; the combination being reflex-reflecting. This hemispherical metallic coating provides a reflector both for light rays which penetrate the uncoated half of the microspheroid and impinge upon the concave inner surface of the metal coating, and for light rays which impinge upon the convex outer surface of the metal coating. There are many millions of reflective pigment particles in a cubic inch or cubic centimeter thereof. The spheroidal shape of the particles makes for a very free-flowing or "fluid" mass when the pigment material is in dry form, and facilitates mixing with varnishes to obtain uniform dispersions that do not form a hard cake on settling and can be easily redispersed by stirring.

The reflective pigment may be sprinkled on the surface of a paint or varnish coating while the latter is in an undried, plastic and tacky state.

However, the principal use of the pigment that is contemplated is for pigmenting transparent varnish solutions to provide liquid reflective coating compositions which can be applied to desired base surfaces in mixed form. The term "varnish" is employed in its broad sense and includes not only oil and spirit resin varnishes but lacquers (such as nitrocellulose lacquers), which provide adequately durable transparent film coatings when coated and dried.

Reflective varnish compositions can be readily formulated for application in various ways, as by spraying, painting, printing, and screen-processing, to provide reflective coatings by a single-step procedure. For this usage the pigmented varnish composition may consist of about ⅓ reflective pigment and ⅔ transparent varnish solution vehicle, by weight. The vehicle consists of the non-volatile film-forming solids (such as nitrocellulose) dissolved in a high proportion of volatile solvent which thins down the mixture to the desired extent. Upon application to the base surface, the microspheroids will flow out to form a mono-layer containing tens of thousands per square inch or square centimeter. The varnish will drain from these embedded pigment particles during evaporation of the solvent so that, when the coating has dried, a surface layer of protruding and optically exposed reflective microspheroids is provided. The dried varnish film forms a thin transparent skin over the tops so that the outer surface has a corresponding spherulate or lenticular contour exposed to the atmosphere. The proportion of varnish solids (which form the dried film) is, however, sufficient to provide secure anchorage of the reflective pigment to the base surface. It has been found that a 1 to 20 ratio by weight of varnish solids to volatile solvent is of the right order for most applications.

The reflective microspheroidal pigment particles of the pigment mass and of the applied coating are non-oriented owing to the random rotations previously experienced. As to each microspheroid it is a matter of chance as to the direction in which the non-reflectorized portion points. However, for any small area, say an area of a tenth of a square inch or square centimeter, a beam of light rays directed upon the surface will impinge upon a large number of pigment particles, which randomly point every which way relative to the axis of the beam of light, and the effect will average out since an observer's eyes cannot distinguish the light rays coming from individual pigment particles. Each small area will thus have essentially the same visual reflection characteristic as every other small area and the over-all effect will be uniform.

The optimum size of the microspheroids from the standpoint of reflection efficiency and of dispersion and suspension in the varnish vehicle is 10 to 50 microns diameter. A micron is a thousandth of a millimeter. (There are 25 microns in a mil, which is a thousandth of an inch, so this range is approximately 0.4 to 2 mils.)

The invention makes possible highly effective reflective coating compositions that can be utilized in aerosol "bomb" or "spray-can" applicators from which the composition can be sprayed on any desired surface. The pressure is provided by a volatile propellant liquid having a high vapor pressure that is included in the vessel. For example, the reflective coating composition can be readily sprayed on bridge abutments, concrete curbings, posts, tree trunks, etc., to provide reflectorization that has a brilliant visibility at night to motorists and serves as a guide or as a warning of a hazard. The daytime appearance is not materially changed owing to the inconspicuousness of the coating except when viewed under reflex-reflecting conditions. A highway patrolman can carry a small applicator in his car or motorcycle and can conveniently stop and reflectorize any object that appears in need of greater nighttime visibility. The compositions can also be sprayed from a spray-gun.

Temporary highway safety markers and signs can be easily prepared. There is also a market for temporary advertising signs that are inexpensive and have high visibility at night to motorists. Examples are signs advertising special sales, and posters used during political campaigns. These can readily be made in quantity as by spraying the reflective coating composition on inexpensive cardboard backings using a stencil procedure, or by screen process printing.

Fabrics can be reflectorized with a dilute spray of the coating composition to provide a treatment which is substantially invisible under normal daylight viewing conditions, and which does not appreciably affect the feel or hand of the fabric. For instance, a shirt, jacket or overcoat can be treated in this way to render the wearer highly visible to motorists at night when he is on or alongside a highway, thereby providing greater safety.

When clear (colorless) microspheroids are used, the reflected light will have the color of the reflective metal. Thus silvery reflection is obtained when they are aluminized. By using microspheroids made from transparent colored glass, other color effects can be obtained. The reflectorized microspheroids can be provided with a concentric transparent color coating. Another expedient is to provide a hemispherical color coating over the reflector coating to impart daytime color to the reflective varnish coating, owing to the lack of orientation of the particles therein.

When the reflective particles are true spheres, optimum reflective brilliancy for the above-mentioned type of single-step coating procedure, is obtained by employing spheres made of glass having a refractive index of at least about 1.8 and preferably about 1.9. Incident light rays which impinge upon the non-reflectorized portion of the surface are brought to an approximate focus at the concave reflective surface provided by the hemispherical metal coating. By using particles which are prolate spheroids, having a major axis greater than the minor axis, a pole of the major axis being at the approximate center of the hemispherical reflectorized area, equivalent focussing of light rays can be obtained at lower refractive indices. Another way to obtain equivalent focussing using glass of lower refractive index is to provide a concentric spherical shell or coating of transparent material upon the glass sphere to provide a composite spheroid, which is then hemispherically reflectorized; the coating material being selected so as to have a lower refractive index than that of the core. Still another way is to apply a transparent spacing coating over approximately a hemispherical portion of the sphere, and apply the metal coating upon this spacing coating, thereby increasing the length of the optical axis. The appropriate dimensions can be determined graphically by drawing a diagram and tracing the refracted rays of an incident bundle of paraxial rays. These will never come to a perfect point focus owing to aberration effects but the dimensions for any geometrical structure can be selected to produce focussing within a small area.

A useful modification is to compound a reflective coating composition containing a mixture of reflectorized spheres of about 1.9 refractive index and reflectorized spheres of about 2.5 refractive index, to be used for spraying outdoor surfaces, such as bridge abutments, by the one-step procedure. The dried reflective coating has improved visibility when wet by rain, as compared to one exclusively containing the 1.9 index type of sphere without serious loss of visibility when dry. The 1.9 index type of sphere has optimum reflex-reflecting efficiency when the spherulate surface of the coating contacts air, while the 2.5 index type has optimum efficiency when the spherulate surface contacts a layer of water.

The previously described reflective varnish coating which has been applied to a desired base and dried, can be modified by coating the spherulate surface with a transparent varnish, colored or clear, which covers over the protrusions and provides, when dried, a flat outer surface. In this situation, the optimum refractive index of sphere particles is about 2.8 to obtain the best focussing effect. Glass of considerably lower refractive index can be used to obtain adequate focussing by employing the spheroidal modifications noted above. When a clear varnish and clear glass are employed, and the particles are reflectorized with a silvery metal, such as aluminum, a brilliant silvery appearance is secured. Any desired color can be obtained by adding transparent color pigment or dye to the varnish so that the dried top coat will serve as a color filter. This latter procedure permits of providing smooth-surfaced decorative and protective finishes on automobile bodies, or on selected areas thereof, that have greatly improved nighttime visibility and yet have a normal daytime appearance. The color styling is effectively retained under nighttime viewing conditions.

All such hemispherically reflectorized microspheroids, whether spherical in a strict sense or spheroidal, which are designed to provide suitable focussing under the intended conditions of use, may be generically designated as "reflex-reflecting." This is a recognized term used to designate the property of a suitable combination of a lens and a back reflector (upon which incident light rays are brought to approximate focus) of returning the reflected rays in a cone back toward the source of the light even when the incident rays are at a substantial angle to the optical axis. The reflectorized microspheroids of this invention are reflex-reflecting in respect to light rays that penetrate and are refracted by the transparent spheroid (serving as a lens) and are reflected from the inner or concave surface of the hemispherical metal cap. They may be referred to as reflex-reflecting catadioptric pigment particles.

A dried pigmented varnish coating upon a base surface, formed from a coating composition of the present invention, provides a reflective area having a vast number of non-oriented reflectorized microspheroids per square inch or square centimeter, and they point every which way. Despite the lack of orientation of the reflective particles, a beam of light will be efficiently reflected so that the reflective area has a high degree of visibility to persons located near the axis of the beam, as for instance to the occupants of a vehicle whose headlights provide the illumination. This is true even when the observer's line of sight is not approximately perpendicular to the reflective area but is at a substantial angle.

In the case of any beam of light rays impinging on the surface, even at a considerable angle, a substantial proportion of the light rays will strike the non-reflectorized portions of exposed microspheroids and will undergo reflex-reflection by passing into these particles and being efficiently reflected from the concave hemispherical metallic surfaces, the reflected rays returning in large part toward the source. Other light rays will impinge upon external convex metal surfaces that are exposed and will undergo diffused reflection; only the rays which impinge substantially perpendicularly thereto being reflected back toward the source. The total effect is to return toward the source a sufficient proportion of the incident light rays in a concentrated cone to provide a high degree of visibility to persons located near the axis of the incident light. This is true even when the angle of incidence is substantial, and hence the signs and markers have what is known as good reflex-reflection "angularity," also known as "wide-angle" reflex-reflection. This means that highway signs and markers have good nighttime visibility to motorists even when they do not face substantially directly toward the observer, and even when they have a curved surface (as in the case of posters tacked on telephone poles and in the case of reflectorized tree trunks).

In contrast, a mirror type of sign or marker provides specular reflection and returns reflected rays toward the source only when the angle of incidence is zero (i.e., when the rays impinge perpendicularly to the surface of the mirror). A surface coated with a dried varnish containing leafed-out aluminum flakes provides semi-specular reflection and visibility is poor for persons located near the axis of an angularly incident beam of light. Signs and markers of these types must be viewed from approximately dead ahead to have good visibility. This prevents general utility for roadside signs and markers, since they are ordinarily so located that they can be viewed from dead ahead for only an instant from a rapidly moving vehicle.

An ordinary painted or enamelled sign surface provides non-specular or diffused reflection, owing to the reflection characteristic of the jagged pigment particles which causes a beam of light to be reflected in all directions. Some light rays are reflected in the direction of the source of light, but most of the light of an angularly incident beam of light, but most of the light is scattered in other directions. Diffused reflection is also obtained when the pigment consists of microspheroids that are reflectorized over the entire surface, no opportunity being provided for reflex-reflection, contrary to the behavior of the hemispherically reflectorized microspheroids of the present invention. Signs and markers which are painted or printed with the reflective coating composition of the present invention have much greater visibility under general nighttime highway viewing conditions, owing to the wide-angle reflex-reflecting characteristic.

The following table illustrates the relative reflection intensities for various samples as measured by a photometer located close to the beam of incident light, the divergence angle being ⅓° and being representative of the average divergence angle encountered in typical highway viewing conditions. (The divergence angle is the angle subtended between straight lines connecting the light source to the reflective area and connecting the reflective area to the viewing eye or photometer.) The reflection intensities are shown for angles of incidence of 10°, 20°, 30° and 40°. (The angle of incidence is the angle subtended between a straight line connecting the source to the reflective area and a line perpendicular to the plane of the reflective area.) The same light beam source was used for all measurements. In each instance the value given is the ratio of the photometer reading for the sample being tested to the reading for a typical glossy white enamelled sign surface (used as a comparison standard), both having the same area and being measured at the same angle of incidence.

| Reflective Surface | Relative Reflection Intensities at Designated Angles of Incidence | | | |
|---|---|---|---|---|
| | 10° | 20° | 30° | 40° |
| White sign enamel (diffused reflection) | 1 | 1 | 1 | 1 |
| Aluminum paint (semi-specular reflection) | 0 | 0 | 0 | 0 |
| This Invention (reflex-reflection) | 100 | 100 | 100 | 90 |

The above-noted sample prepared with the reflective coating composition of this invention was made by spraying a cardboard base with a nitrocellulose lacquer similar to that of Formula A (given hereafter) containing glass spheres of 1.9 refractive index, diameter range of 15 to 40 microns, hemispherically reflectorized by an aluminum coating applied by vapor deposition under high vacuum. The "zero" values for the aluminum paint sample signify values which are very small compared to those for the white enamel sample; the former type has a dark gray appearance when visual comparison is made at the designated angles, and has a brilliant silvery appearance only when viewed from substantially dead ahead (i.e., when the angle of incidence is zero or quite small).

The following formulas illustrate preferred varnish compositions useful in the practice of this invention, all proportions being in percentages by weight to total 100.

| | A | B | C | D |
|---|---|---|---|---|
| Nitrocellulose (high viscosity type) | 3.25 | | 3.25 | 3.25 |
| Neoprene rubber mix (polychloroprene rubber including 1.5% sodium acetate, 4% MgO, 5% ZnO, 2% antioxidant) | | 9.26 | | |
| Screen process clear resin (75% solids)¹ | | | | 4.00 |
| Alkyd varnish resin | | | 3.23 | |
| Phenolic varnish resin | | 6.86 | | |
| Cumarone resin (pale) | | 2.30 | | |
| Ethyl alcohol (denatured) | 1.75 | 0.92 | 1.75 | 1.75 |
| Butyl alcohol | | | | 1.00 |
| "Butyl Cellosolve" (ethylene glycol monobutyl ether) | 2.00 | | 2.00 | 2.00 |
| "Cellosolve" (ethylene glycol monoethyl ether) | 45.00 | 11.12 | 41.75 | 40.00 |
| Naphtha | 24.00 | | 24.00 | 24.00 |
| Cyclohexanone | | 7.94 | | |
| Toluol | | 61.60 | | |
| Lacquer thinner | 24.00 | | 24.00 | 24.00 |
| Cobalt varnish drier | | | 0.02 | |

¹ Any typical screen process clear resin composition, used in making coating compositions for silk screen printing (e.g., "Du Pont RC 283").

The final reflective varnish compositions are made by mixing the varnish composition of the selected formula with reflective pigment (reflectorized microspheroids of 15 to 40 microns diameter) in a weight ratio of 65:35 to make 100 parts by weight of product.

Formula A product is well adapted for spraying on concrete curbing, trees, posts, etc. Formula B product is well adapted for spraying on clothing. Formula C product is well adapted for roll-coating embossed metal signs. Formula D product is well adapted for use in printing show card stock by the silk screen process for temporary low cost signs.

A reflective finish having a flat glossy surface is necessary or desirable in certain instances to provide an attractive daytime appearance and a surface that can be readily cleaned and which has a minimum tendency to collect dust and dirt. The present invention can be utilized in making flat-surfaced reflective coatings of this type, as well as coatings of the type just previously described which have a lenticular outer surface.

These flat-surfaced reflective finishes are conveniently made by applying to the base surface a coating composition containing hemispherically reflectorized glass microspheroids (serving as the reflective pigment) mixed with a transparent varnish and a volatile solvent, having a consistency and coating weight which results in a mono-layer of the reflective particles embedded within the dried coating. The outer surface of this coating is not flat owing to protrusions. A top coat of transparent varnish is then applied to produce a flat glossy surface; and it may include transparent coloring material, such as the well-known transparent phthalocyanine pigments, to impart a desired color appearance; the colored top coating then also functioning as a colored light filter. Coloring material may also be included in the underlying coating that contains the reflective pigment. To obtain a daytime appearance similar to the nighttime appearance, the reflective pigment coating should be applied over an opaque primer or ground coating having the desired color.

The daytime and nighttime reflectivity can be controlled by varying the concentration (proportion) of the reflective pigment particles in the coating composition, so as to vary the number per unit area in the final coating. A convenient way to obtain uniform spacing-apart of these reflectorized microspheroids is to utilize a mixture with minute transparent (non-reflectorized) particles which are of similar size and serve as transparent lateral spacing elements in the coating. The spacing particles will transmit light through the coating with little light-scattering when they have a refractive index approximately the same as that of the dried varnish, and may consist of minute granules or glass spheres.

In this embodiment, owing to the flat outer surface of the composite coating, the optimum refractive index of reflectorized spheres is about 2.8 when embedded in dried varnishes of conventional refractive index (about 1.5), thereby securing a refractive index ratio of about 1.9. As previously explained, an equivalent result can be obtained by employing spheres of lower refractive index and using a spacing coating, underlying the metal coating, to provide optical compensation in securing the desired focal arrangement.

The above-described flat-surfaced reflective finish has noteworthy application for providing the colored finish on the bodies of automobiles and other vehicles, either on the entire body or on selected areas or panels. Without sacrifice of an attractive daytime and nighttime appearance, the nighttime visibility is greatly enhanced when driving on a highway and when parked along a highway, as viewed by the drivers of other vehicles whose headlights provide illumination. A substantial improvement in safety results. The procedure obviously has other applications, as in fabricating highway signs where a flat glossy surface is desired.

The following formula example illustrates a suitable coating composition containing reflectorized microspheroids for use in the above procedure, and it is suitable for application by means of a spray-gun. It does not specify coloring material, which is optional and when employed is incorporated in amount to produce the desired effect. All parts are by weight.

| | E |
|---|---|
| Reflective pigment | 14.3 |
| Nitrocellulose mixture (½ second viscosity type wet with one part butyl alcohol per two parts nitrocellulose) | 9.1 |
| Non-drying alkyd resin plasticizer for nitrocellulose mixed with equal weight of toluol | 36.0 |
| Melamine-formaldehyde hardener mixed with equal weight of 60:40 blend of butyl alcohol and xylol | 3.6 |
| Butyl acetate | 12.0 |
| Ethyl acetate | 6.0 |
| Butyl alcohol | 1.0 |

In the above formulation, the non-volatile varnish solids of the dried coating consist of the nitrocellulose and alkyd resin blend including the hardener. The volatile solvents are the butyl acetate, ethyl acetate, butyl alcohol, toluol and xylol. The ratio by weight of the reflective pigment to the non-volatile varnish solids is approximately 1:2, and the coating composition contains approximately 40% by weight of volatile solvents.

An example of suitable reflective pigment for this usage is provided by glass spheres of 2.5 refractive index in the size range of 12 to 18 microns diameter, which have been given a hemispherical spacing coating of sodium aluminum fluoride that is approximately 2 microns thick over which has been applied an aluminum reflector coating.

The composition for the top coating can be substantially the same, except for the omission of the reflective pigment, and will include transparent coloring material when a colored finish is desired.

The microspheroids can be hemispherically reflectorized by various procedures.

One way is to use a high-vacuum metal vapor deposition procedure. A carrier web having a non-volatile plastic tacky surface (such as a plasticized resin layer) is coated with a layer of minute glass spheres of the desired size which are partially pressed in, the excess being brushed off to leave a mono-layer adhering to and partially embedded in the carrier surface. If desired, the exposed portions of the spheres can be given a coating of transparent solid material to provide hemispherical spacers, as previously mentioned. One way to do this is to pass the web, sphere side down, through a region of a high-vacuum chamber where it is subjected to a vapor that condenses on the lower halves of the spheres, the vapor being produced from a material that is located beneath the web and is suitably heated. Cryolite (sodium aluminum fluoride) is a preferred example. The thickness of the coating is determined by the length of exposure time. Trial tests on samples can be made to determine the time needed for obtaining a coating having a thickness that imparts the desired reflex-reflecting characteristic to the final reflectorized microspheroids. The carrier web, sphere side down, is then passed through a region of a high-vacuum chamber where it is subjected to aluminum vapor arising from a source located therebeneath, the exposure time being sufficient to deposit a thin opaque reflective coating of metallic aluminum on the lower half of each sphere, this deposition being upon the spacing coating if such has been provided. The exposure time can be conveniently ascertained by subjecting a glass plate to the aluminum vapor and determining the time required to form a metallic coating having an electrical resistance of not more than 1 ohm per sq. cm. The reflectorized particles are subsequently removed from the carrier sheet by means of a rotary wire brush. Other metals, such as tin and copper, which are suitable for vacuum vapor coating, can be used in place of aluminum.

Another process is to half-embed a mono-layer of minute glass spheres in a hot-water-soluble coating (such as glue or dextrin coating) on a carrier web. The exposed glass surfaces the then chemically silver plated by solutions sprayed on the surfaces. They may be given a preliminary spraying adapted to provide spacing coatings. The web is subsequently passed through a hot water bath to release the reflectorized particles.

Still another process is to form a releasable mono-layer of minute glass spheres on a heat-resistant carrier and plate the hemispherical upper surface by exposure to a metal carbonyl gas that is reduced in situ. Nickel and chromium platings can be made in this way.

Since the above-mentioned processes of vapor coating and metal plating are applications of known procedures to the particular cases described, detailed working descriptions are not needed.

We claim:

1. A free-flowing pigment mass of non-oriented transparent glass microspheroids that are hemispherically reflectorized by a metal coating and are reflex-reflecting, there being many millions in a cubic inch thereof.

2. A free-flowing pigment mass of non-oriented transparent glass microspheroids that are hemispherically reflectorized by a metal coating and are reflex-reflecting, the glass having a refractive index of at least 1.8 and the microspheroids having a diameter of 10 to 50 microns.

3. A liquid reflective coating composition comprising a mixture of transparent varnish solution vehicle and reflex-reflecting catadioptric pigment consisting of transparent glass microspheroids that are hemispherically reflectorized by a metal coating, the ingredients being selected and proportioned such that the composition can be applied to a base surface to provide a dried transparent varnish coating bonded thereto containing an initially optically-exposed embedded layer of tens of thousands of non-oriented reflectorized microspheroids per square inch.

4. A liquid reflective coating composition comprising a mixture of transparent varnish solution vehicle and reflex-reflecting catadioptric pigment consisting of transparent glass microspheroids that are hemispherically reflectorized by a metal coating, the glass having a refractive index of at least 1.8 and the microspheroids having a diameter of 10 to 50 microns, the ingredients being selected and proportioned such that the composition can be applied to a base surface to provide a dried transparent varnish coating bonded thereto containing an initially optically-exposed embedded layer of tens of thousands of non-oriented reflectorized microspheroids per square inch.

References Cited in the file of this patent
UNITED STATES PATENTS

| 1,902,440 | Gill | Mar. 21, 1933 |
| 2,270,210 | Barbieri | Jan. 13, 1942 |
| 2,304,754 | Wainer | Dec. 8, 1942 |
| 2,354,049 | Palmquist | July 18, 1944 |
| 2,440,584 | Heltzer et al. | Apr. 27, 1948 |
| 2,574,972 | Hill | Nov. 13, 1951 |
| 2,610,922 | Beck | Sept. 16, 1952 |

FOREIGN PATENTS

| 670,107 | Great Britain | Apr. 16, 1952 |